Figure 1:
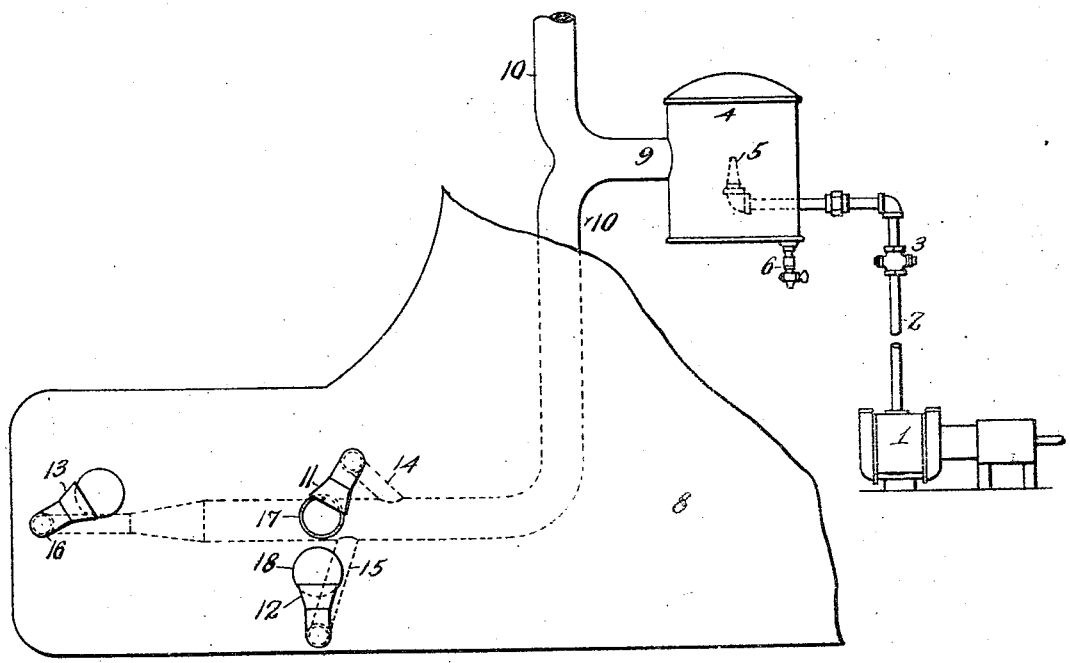

R. S. SPERRY.
METHOD OF PROTECTING HYGROSCOPIC SUBSTANCES FROM ATMOSPHERIC MOISTURE.
APPLICATION FILED OCT. 23, 1915.

1,178,187.

Patented Apr. 4, 1916.

Inventor:
Roger S. Sperry
by his Atty's

UNITED STATES PATENT OFFICE.

ROGER S. SPERRY, OF WATERBURY, CONNECTICUT, ASSIGNOR TO SCOVILL MANUFACTURING COMPANY, OF WATERBURY, CONNECTICUT, A CORPORATION OF CONNECTICUT.

METHOD OF PROTECTING HYGROSCOPIC SUBSTANCES FROM ATMOSPHERIC MOISTURE.

1,178,187.    Specification of Letters Patent.    Patented Apr. 4, 1916.

Application filed October 23, 1915. Serial No. 57,624.

*To all whom it may concern:*

Be it known that I, ROGER S. SPERRY, a citizen of the United States, residing at Waterbury, county of New Haven, and State of Connecticut, have invented certain new and useful Improvements in Methods of Protecting Hygroscopic Substances from Atmospheric Moisture, fully described and represented in the following specification and the accompanying drawings, forming a part of the same.

This invention relates to improvements in methods for preventing the absorption of moisture from the atmosphere by a previously dried hygroscopic product exposed to the atmosphere, and has for its especial object the keeping of this dried product dry during its handling while so exposed.

While applicable to other uses, the improved method is especially suitable for keeping previously dried powder dry while it is being loaded into the fuse blocks for shells, and the improved method will be described in its application of keeping powder dry during such loading operations.

Generally, the method consists in discharging down onto and over the surface of previously dried powder a slowly moving current of dry air under a small pressure so as to form a protecting layer or blanket of such air over the powder, the atmospheric air of the room or chamber in which the powder is being manipulated being left in its normal condition as to content of moisture. This current of dry air, moving slowly over the powder, forms in effect a blanket between the powder and the atmospheric air of the room and effectually prevents the absorption by the powder of moisture from the atmosphere while it is exposed. The dried air may be supplied from any suitable source, and the air may be dried in various ways. In the preferred practice of the method, however, the dry air is obtained by compressing air in an air compressor and trapping in the usual way the water forced out of it by the compressing, and then expanding the air in a suitable expansion chamber to about atmospheric pressure, sufficient pressure being maintained, however, to provide a slow, gentle flow of air over the surface of the powder. While the amount of compression to sufficiently dry the air by expansion may, of course, be varied, it has been found in practice that air compressed to about seventy-five pounds will expand sufficiently to so proportion the remaining moisture in it to the volume of expanded air, that the air is substantially dry for the purposes required. The expanded dried air is somewhat cooler than the atmospheric air, and consequently heavier than the surrounding atmospheric air and tends to settle down over the powder and helps to more effectually blanket it from the surrounding atmosphere. In the preferred practice of the method, therefore, this cool dry air is preferably employed. The dried air, under slight compression, moves from the expansion chamber through suitable pipes and through nozzles situated so that it will be discharged down onto and over the surface of the powder during its various manipulations. To maintain the dried air in its somewhat cooler condition than the surrounding atmosphere until it is discharged from the nozzle, the expansion chamber and the pipes leading to the nozzles are preferably insulated with any suitable heat insulating material.

A simple apparatus for carrying out the above method, when applied to keeping powder dry, is diagrammatically illustrated in the accompanying drawing, in which—

Figure 2:
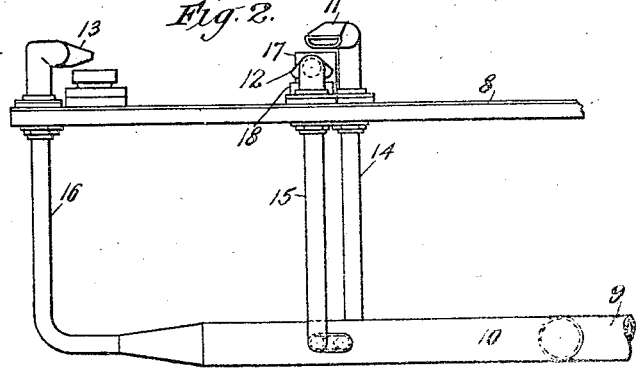

Figure 1 is a view partly in elevation and partly in plan of the apparatus, certain parts being broken away for the purpose of clearness, and Fig. 2 is a side elevation of a part of the apparatus shown in Fig. 1, showing the delivery nozzles.

Referring to the drawings, 1 indicates an air compressor of any suitable type in which the air to be dried is compressed. This compressor may be located at any convenient place in the plant where the loading is to be effected. It is preferable, however, to have the compressor at some distance, say 1000 feet, from the loading room, in order to avoid any possibility of a flash through the pipes in case of an explosion in the compressor, and to give the compressed air a full opportunity to cool and deposit water, which will be trapped off in any suitable manner. This air compressor is connected through a pipe 2, having a valve 3, with an expansion chamber 4, which is of any suitable character, such as a tank. This air is somewhat cooler than the surrounding atmosphere, and to keep it at such temperature the tank is preferably insulated. The air is expanded in this expansion chamber through a nozzle 5 dimensioned to supply the amount of air required. This expansion chamber is or may be provided with a draw-off 6, through which any deposited moisture in the chamber may be removed. The expanded and dried air is delivered from this chamber to a suitable loading table 8 through a pipe 9. This pipe may be a branched pipe, as shown, to supply both sides of a loading table, only one-half of which is indicated. The dried air is delivered from this pipe to nozzles by which it is distributed down onto and over the powder while it is being manipulated. In the particular construction shown, there are three nozzles 11, 12 and 13, to which air is supplied by branch pipes 14, 15 and 16. The nozzles are preferably (as shown) formed with wide orifices and shaped to direct the air down onto and over the powder and form a slowly moving blanket or film of air over it. In the particular construction illustrated, the nozzle 11 supplies dried air over a powder can or other powder receptacle, indicated at 17, and the nozzle 12 supplies air over the fuse block which is positioned on a support indicated at 18, this fuse block, in the particular description of the method given being the article into which the powder is being loaded. The block is filled with powder on the support 18 and is removed to a support over which a nozzle 13 is provided for supplying air the powder being here roughly packed in the block before it is finally compressed in the block by suitable apparatus, a description of which is not necessary for an understanding of the present invention, and hence is not shown.

With this method as described the powder, both in the can or other receptacle from which it is loaded, and in the receptacle into which it is loaded, may be kept perfectly dry, at the same time leaving the atmospheric conditions of the loading room normal, with the result that healthier conditions for the operatives are secured, and the use of expensive devices for keeping the air of such rooms at a certain predetermined moisture content is obviated.

While the invention has been described in connection with the manipulation of powder, it is applicable also to the manipulation of various other hygroscopic, previously dried, substances which have to be manipulated and which have to be maintained in a dried condition.

No claims are herein made to the apparatus shown and described, but such apparatus forms the subject-matter of a separate application, Serial No. 57,625, filed October 23, 1915.

What is claimed is:

1. The method of preventing the absorption of moisture by a dried hygroscopic substance while it is being handled under ordinary atmospheric conditions, which consists in directing dried air down onto and over the surface of the substance to form a layer or blanket of such air between the substance and the surrounding atmosphere.

2. The method of preventing the absorption of moisture by a dried hygroscopic substance while it is being handled under ordinary atmospheric conditions, which consists in directing dried air at a lower temperature than the surrounding atmosphere onto and over the surface of the substance to form a layer or blanket of such air between the substance and the atmosphere.

3. The method of preventing the absorption of atmospheric moisture by a dried hygroscopic substance while it is being handled under ordinary atmospheric conditions, which consists in directing a slowly moving current of dried air onto and over the surface of the substance to form a layer or blanket of such air between the substance and the surrounding atmosphere.

4. The method of preventing the absorption of atmospheric moisture by a dried hygroscopic substance while it is being handled under ordinary atmospheric conditions, which consists in directing a slowly-moving current of dried air at a temperature lower than that of the surrounding atmosphere onto and over the surface of the substance to form a layer or blanket of such air between the substance and the surrounding atmosphere.

5. The method for preventing the absorption of moisture by a dried hygroscopic substance while it is being handled under ordinary atmospheric conditions, which consists in expanding compressed air to a pressure above atmospheric to dry the air, and directing a slowly-moving current of the dried air onto and over the surface of the substance to form a layer or blanket between it and the atmosphere.

6. The method for preventing the absorption of moisture by a dried hygroscopic substance while it is being handled under ordinary atmospheric conditions, which consists in expanding compressed air to a pressure above atmospheric to dry the air, maintaining the air at a temperature lower than the surrounding atmosphere, and directing the dried and cooled air onto and over the surface of the substance to form a layer or blanket between it and the atmosphere.

7. The method of loading dried powder into fuse blocks and the like, which consists in expanding compressed air to dry the air, and directing a current of such dried air onto and over the powder supply and over the fuse block so that a layer or blanket of dried air will be formed and protect the powder from the surrounding atmosphere while being handled.

In testimony whereof, I have hereunto set my hand.

ROGER S. SPERRY.